United States Patent [19]

Ross

[11] 4,141,213
[45] Feb. 27, 1979

[54] PILOT FLAME TUBE

[75] Inventor: Phillip T. Ross, Indianapolis, Ind.

[73] Assignee: General Motors Corporation, Detroit, Mich.

[21] Appl. No.: 809,290

[22] Filed: Jun. 23, 1977

[51] Int. Cl.² ............................ F02C 7/18; F02C 7/26
[52] U.S. Cl. ................. 60/39.67; 60/39.82 P; 431/285; 431/352
[58] Field of Search .............. 60/39.82 P, 39.82 R, 60/39.74 R, 39.66, 39.65, 39.67; 431/285, 352

[56] References Cited

U.S. PATENT DOCUMENTS

| | | | |
|---|---|---|---|
| 2,654,219 | 10/1953 | Zaba | 60/39.65 |
| 2,734,341 | 2/1956 | Lovesey | 60/39.82 P |
| 2,744,384 | 5/1956 | Loughran | 60/39.82 P |
| 2,967,224 | 1/1961 | Irwin | 431/285 |
| 3,349,558 | 10/1967 | Smith | 60/39.65 |
| 3,930,368 | 1/1976 | Anderson et al. | 60/39.71 |
| 3,954,389 | 5/1976 | Szetela | 431/285 |
| 4,012,904 | 3/1977 | Nogle | 60/39.71 |

Primary Examiner—Robert E. Garrett
Attorney, Agent, or Firm—J. C. Evans

[57] ABSTRACT

A combustor assembly for an automotive gas turbine engine includes a continuously ignited, pilot flame tube supported on a combustor dome immediately downstream of an inlet fuel nozzle and air swirler assembly. The pilot flame tube has an air swirler and fuel nozzle supported on an interior bulkhead and air is supplied upstream of the bulkhead and through a double-walled porous tube assembly for cooling wall portions of the flame tube exposed to the flame front within the combustor and wall portions thereof exposed to a pilot flame formed within the flame tube.

4 Claims, 4 Drawing Figures

PILOT FLAME TUBE

This invention relates to gas turbine engine combustor assemblies and more particularly to automotive gas turbine engines having continuous ignition systems.

In order to control combustion emissions in an automotive gas turbine engine, combustor assemblies often have a prevaporization chamber in which air and fuel is mixed prior to discharge into a primary combustion zone within the combustor assembly.

Swirler vanes are located upstream of the prevaporization chamber and a pilot nozzle and igniter assembly is located centrally of the prevaporization chamber to ignite the mixed air and fuel as it passes from the prevaporization chamber into the combustor. One such arrangement is set forth in U.S. Pat. No. 3,930,369 issued Jan. 6, 1976, to Verdouw. In such arrangements, fuel from the pilot fuel nozzle is ignited to start combustion, particularly when the engine is cold and before effective evaporation of fuel from the prechamber wall is attained. In such cases, the pilot nozzle is turned off after normal operation has begun.

An object of the present invention is to provide an improved pilot flame tube for maintaining a continuous pilot flame in an automotive gas turbine engine combustor and wherein the pilot flame tube is located within a primary combustion zone and wherein means are included to shield the pilot flame tube against flame erosion on both the inside and outside walls thereof.

Still another object of the present invention is to provide an improved pilot flame tube for maintaining a continuous pilot light in a combustor assembly, said pilot flame tube including a pilot fuel nozzle with an air swirler thereon supported concentrically within the flame tube which includes an inside wall of porous laminated material joined to an outer peripheral wall of porous laminated material having a portion thereof located within the main combustor reaction zone and wherein the inner and outer walls are spaced apart and in communication with an air supply for directing cooling air between the inner and outer walls for flow therethrough, thereby to shield them against direct exposure to a continuously ignited pilot flame and a flame front within a primary combustion zone within the combustor assembly.

Further objects and advantages of the present invention will be apparent from the following description, reference being had to the accompanying drawings wherein a preferred embodiment of the present invention is clearly shown.

Figure 1:
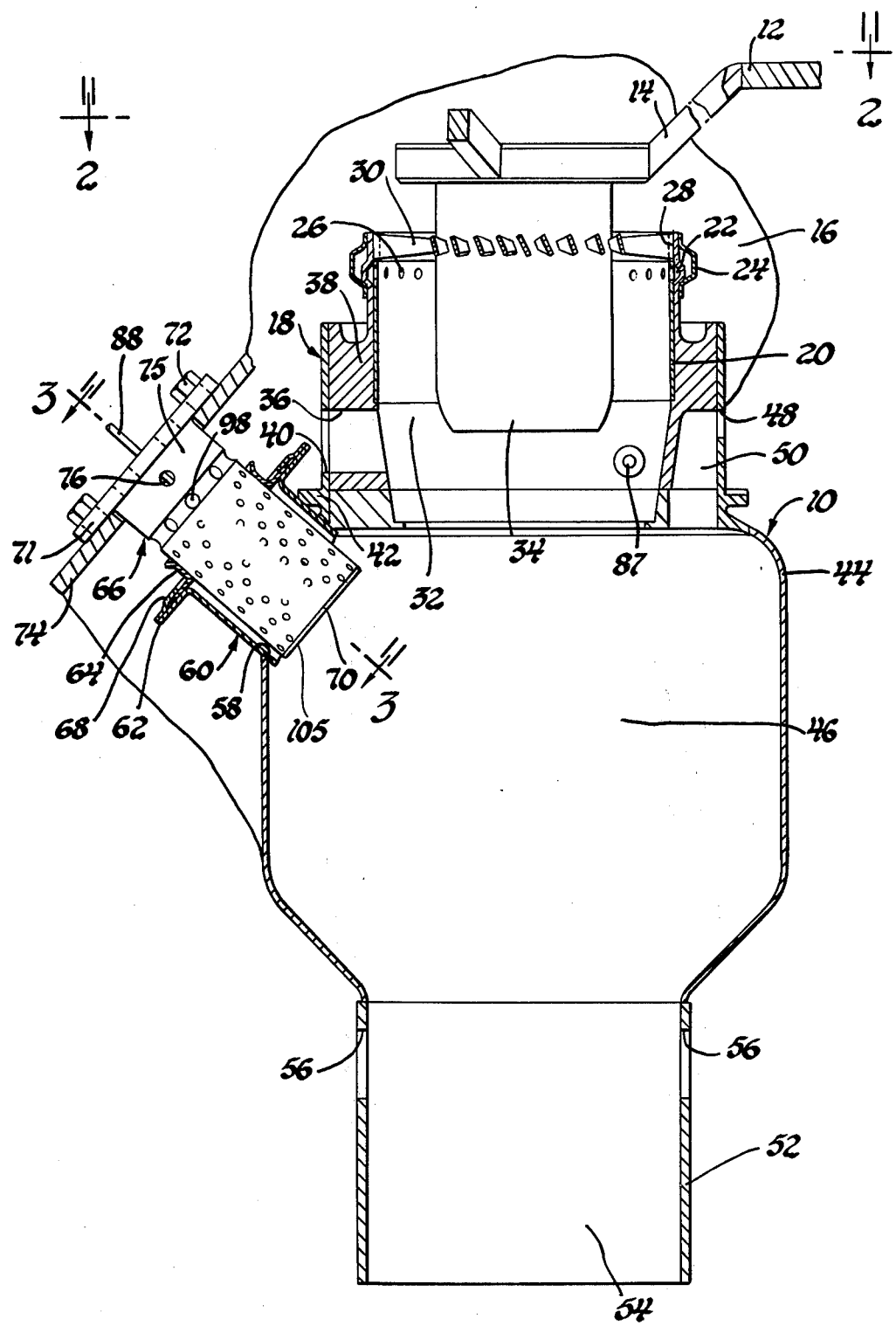
FIG. 1 is a longitudinal sectional view of a combustor taken along the line 1—1 of FIG. 2 showing the pilot flame tube of the present invention.
Figure 2:
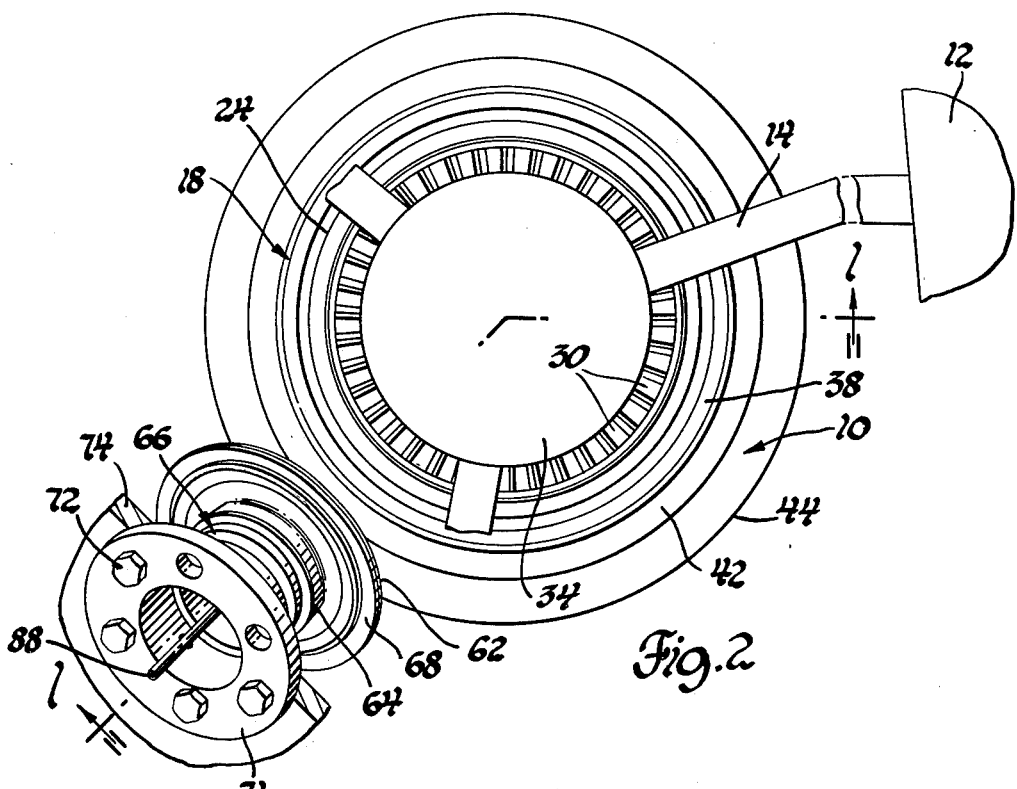
FIG. 2 is a top elevational view of the assembly in FIG. 1 looking in the direction of the arrows 2—2 therein.

Referring now to the drawings, an automotive gas turbine engine combustor 10 is illustrated for association with a gas turbine engine having an outer case 12 in surrounding relationship thereto, a potion of which is shown in FIG. 1. A strut 14 is secured to the combustor 10 for locating it with respect to the case 12.

Further details of such engines and combustor assemblies are set forth in U.S. Pat. No. 3,930,369 issued Jan. 6, 1976, to Verdouw; and in U.S. Pat. No. 3,077,074 issued Feb. 12, 1963, to Coleman et al; in U.S. Pat. No. 3,267,674 issued Aug. 23, 1966, to Coleman et al and U.S. Pat. No. 3,490,746 issued Jan. 20, 1970, to Bell.

The case 12 includes part of an enclosure (not shown) defining a pressurizable chamber 16 around the combustor 10 into which an engine compressor delivers compressed air which may be heated by a regenerator prior to passage into the chamber 16. The combustor 10 includes a fuel and air inlet 18 including a tubular prevaporization chamber wall 20 having fuel supplied thereto through an annular inlet manifold 22 with a surrounding air cooling jacket 24. The manifold 22 is communicated with wall 20 by a plurality of circumferentialy spaced fuel ports 26 at the inlet end 28 of the wall 20. The inlet end 28 also includes an annular row of air swirler vanes 30 through which air passes from the chamber 16 into a prevaporization chamber 32 formed around a center body 34 supported by the swirler vanes 30 concentrically within the chamber 32. Center body 34 also serves as a point of connection for the struts 14 to secure the combustor 10 on the engine wall 12.

Primary combustion air is directed into the prechamber 32 through a plurality of passages 36 formed through a prechamber housing 38 and through an aligned passage 40 in an outer liner 42 that is connected to one end of a combustor wall 44 that surrounds a primary combustion zone 46 located downstream of the prevaporization chamber 32. Primary air also is directed to the primary combustion zone 46 through a plurality of passages 48 formed in the outer liner 42 at circumferential space points thereon to communicate with an axial opening 50 between housing 38 and the liner 42.

The combustor 10 further includes a tubular extension 52 on the outlet end thereof surrounding a dilution zone 54 communicated with the pressurizable chamber 16 through a plurality of dilution air flow ports 56.

Air flow through the dilution ports 56 completes the combustion process within the dilution zone 54 prior to passage of exhaust gases through a turbine nozzle and across a turbine for providing engine power output.

The operation of the combustor 10 is more specifically set forth in the aforesaid U.S. Pat. No. 3,930,369. For purposes of the present invention it is only necessary to point out that compressed air in the chamber 16 is directed through the row of swirler vanes 30 to be directed tangentially with respect to the inside of the prechamber wall 20 where it blows fuel introduced through the ports 26 along the inner surface of the wall 20. The hot, rapidly moving air from the swirler vanes 30 heats and vaporizes fuel and thoroughly mixes it prior to entry into the primary combustion zone 46.

In addition to air introduced to the swirler 30, the illustrated arrangement includes provision for another set of radially inwardly directed air entrance points distributed near the outlet of the prechamber 32 as defined by passages 36, 48. Air flow through the passages 36, 48 can be varied by movable control components if desired. Moreover, these valve components can be correlated with additional components for regulating the amount of air flow through the dilution ports 54 if desired.

The combustor 10 and the air flow paths therein for both prevaporization with fuel flow through the ports 26 and for mixture in the primary combustion zone 46 as well as for final combustion within the dilution zone 54 are representative of combustors suitable for use with the present invention. Moreover, they are set forth as a type of gas turbine engine combustor typically found in automotive gas turbine engines where engine fuel control often requires combustion start under a wide range of operating conditions. For example, starts can occur when the engine is cold and prior to effective evaporation within the prevaporization chamber 32. Starts also can occur following flame-out produced under conditions where air and fuel flow to the engine are reduced as, for example, under deceleration conditions. Under such conditions, it is desirable to include a continuously operated pilot flame exposed to the primary combustion zone 46 so as to assure continuous ignition of an air/fuel mixture directed therethrough. Accordingly, the combustor wall 44 includes a port 58 therein in which is located a pilot flame support tub 60 having an outboard flange 62 thereon connected to a locater ring 64.

A pilot flame tube 66 constructed in accordance with the present invention fits into ring 64 and through tube 60. A reversely bent retainer 68 fixes the ring 64 to the flange 62 so as to axially locate an open end 70 of the pilot flame tube 66 within the primary combustion zone 46. A connector flange 71 on the pilot flame tube 66 is connected by suitable fastener means 72 to a segment 74 of an engine wall which surrounds a part of the pressurizable chamber 16.

Figure 3:
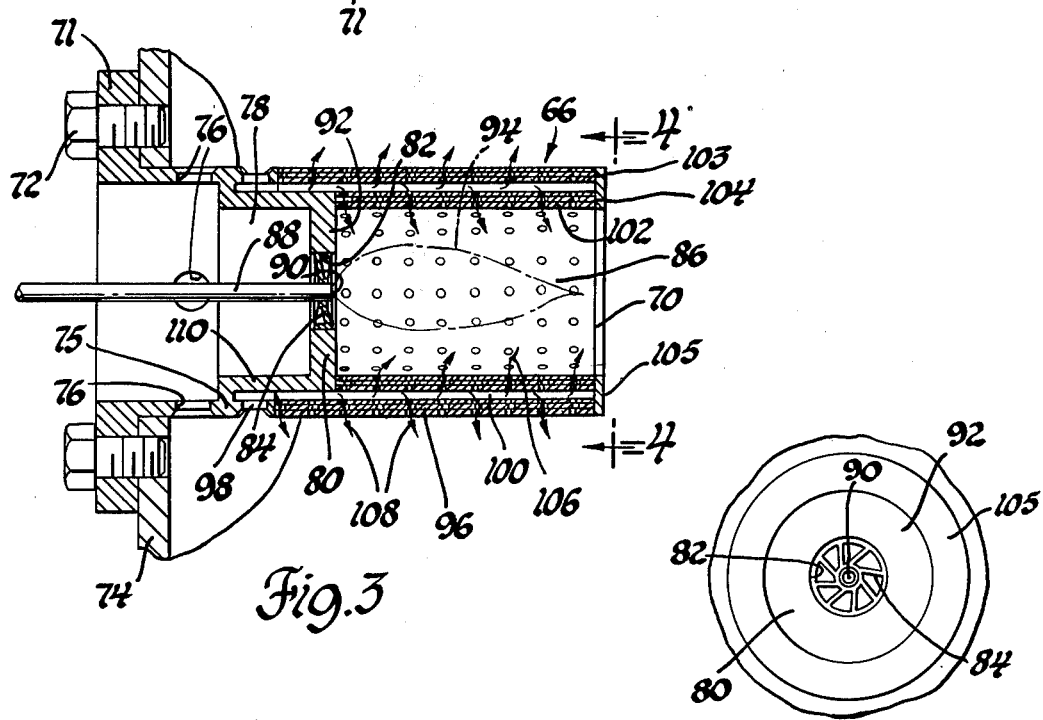
FIG. 3 is an enlarged longitudinal sectional view of the pilot flame tube taken along the line 3—3 of FIG. 1.
Figure 4:
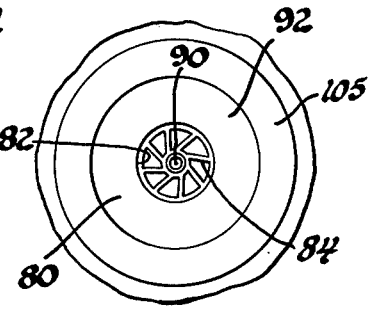
FIG. 4 is an end elevational view taken along the line 4—4 of FIG. 3 looking in the direction of the arrows.

As best seen in FIG. 3, the pilot flame tube 66 includes an imperforate dome or head portion 75 with a plurality of circumferentially spaced holes 76 therein to communicate pressurizable chamber 16 with a space 78 upstream of an internal bulkhead 80 of the flame tube. Bulkhead 80 has a central bore 82 therethrough with an air swirler element 84 therein that directs air from the space 78 into a pilot combustion zone 86 in a tangential fashion to be mixed with fuel directed into the pilot combustion zone 86 from a fuel supply tube 88 having an outlet nozzle 90 therefrom supported centrally of the air swirler 84 at the inlet end 92 of the zone 86.

Electrical ignition occurs from a spark igniter 87 within the prevaporization chamber. It institutes a start cycle of operation. A flame front occurs within the primary combustion zone 46 which will ignite the fuel issuing from the nozzle 90. Pilot fuel flow is continuous so that pilot flame 94 will be maintained continuously within the pilot combustion zone 86 during all phases of gas turbine engine operation. Alternatively, a spark igniter can be located in zone 86 to initiate flame at engine start.

In order to shield the pilot flame tube 66 against high temperature conditions within the primary combustion zone 46 and the pilot combustion zone 86, in accordance with the present invention, the tube 66 includes an annular outer wall 96 of porous laminated material, for example, material of the type set forth in U.S. Pat. No. 3,584,972 issued June 15, 1971, to Bratkovich et al. This wall includes a plurality of inlet air openings 98 on one end thereof to supply air into an annular opening or air space 100 formed between the wall 96 and a second inside wall 102 of like porous laminated materrial which surrounds the zone 86. the spaced, inboard ends 103, 104 of wall 96 and wall 102, respectively, are joined by seal ring 105 at the open end 70 of the flame tube. The openings 98, as seen in FIG. 1 direct air from the pressurizable chamber 16 thence into the annular opening 100 for redistribution through the laminated porous material making up the walls 96, 102.

After engine start, the pilot flame 94 is always present within the pilot combustion zone 86. Air flow inwardly thereof through the inner wall 102 is diagrammatically shown by the arrows 106. It defines a protective sheath between the pilot flame 94 and wall 102 to prevent thermal erosion of the material of the porous laminated material making up the inner wall 102 of the pilot flame tube 66. Likewise, the tube 66 has its open end 70 thereof directly exposed to the main combustion flame front in the primary combustion zone 46. The cooling air passing through the pores of the laminated material in the outer wall 96 is shown diagrammatically by the arrows 108. It will form a protective sheath around the outside of the pilot flame tube 66 to protect it against thermal erosion by flames within the combustion zone 46.

In the illustrated arrangement air is supplied through the holes 76 and inlet air openings 98 which are separated by an axial extension 110 of the imperforate segment 75. In one preferred embodiment, a three layer porous metal sheet configuration is used for each wall 96, 102. Each sheet includes a base layer 0.020 inches thick and with holes of 0.032–0.038 inches diameter located on 0.136 inch centers; a core sheet is 0.020 inches thick. It has sets of holes spaced on 0.136 inch centers. Each hole set includes a square configuration with four corner holes each of 0.037 to 0.031 inches diameter and a center hole within the square of 0.031 to 0.037 inches diameter. An inner sheet is 0.020 inches thick and with sets of holes spaced on 0.136 inch centers. Each set is like that in the core but is offset to the core set.

Preferred material is AMS 5870 and the sheets are held together by being diffusion bonded therebetween. It has been noted that such walls can be exposed continuously to the flame in the main combustion zone and that in the pilot combustion zone for 15 hours. The wall condition at 96 and 102 is significantly improved as compared to flame tubes having uncooled or convection cooled walls thereon which experience deterioration after 15 hours continuous exposure. In the illustrated arrangement, the bulkhead 80 is illustrated as being a solid metal component. If desired the inner wall 102 can extend to form the bulkhead 80 as a laminated porous structure that will be cooled by air flow from the air space 78 into the pilot combustion zone 86.

While the embodiments of the present invention, as herein disclosed, constitute a preferred form, it is to be understood that other forms might be adopted.

The embodiments of the invention in which an exclusive property or privilege is claimed are defined as follows:

1. In an automotive gas turbine engine having fuel flow to a prechamber liner of a combustor for a prevaporization upstream of a combustor wall surrounded by a compressed air source and with the wall defining a primary combustion zone the improvement comprising: a continuously operated pilot flame tube assembly supported on the combustor wall to maintain a continuous ignition flame within the primary combustion zone during engine deceleration, said assembly including a dome located exteriorly of the wall and having an interior bulkhead defining an upstream air space therebetween in communication with said air chamber, a pilot air swirler on said bulkhead including a pilot nozzle for continuously directing fuel and air downstream of said bulkhead for ignition as a continuously burning pilot flame located within said combustor wall for continuously igniting air fuel mixtures within said primary combustion zone, a double-walled open end flame tube surrounding said pilot ignition flame, said flame tube located within said combustor wall and having an outer tubular member of porous material with holes therein and an inner tubular member of porous material with holes therein, said inner tubular member being telescoped within and located in spaced relationship to said outer tubular member to form an air passage therebetween upstream of holes in both said tubular members, said inner and outer tubular members having one end thereof sealed together at the open end of said flame tube to prevent air flow axially therefrom into said primary combustion zone, cooling air entrance means to direct compressed air from said air source to the surfaces of said inner and outer tubular members which define said air passage therebetween, said inner tubular member holes receiving air from said air passage for redistributing air as a sheath radially inwardly of said inner tubular member to continuously shield it from said pilot flame, said outer tubular member holes receiving air from said air passage for redistributing air as a sheath radially outwardly through said outer tubular member to shield it against a flame within said combustor primary combustion zone thereby to maintain a continuous pilot flame within said primary combustion zone to prevent flameout therein during engine decelerations wherein air and fuel flows are reduced to the primary combustion zone.

2. In an automotive gas turbine engine having fuel flow to a prechamber liner of a combustor for a prevaporization upstream of a combustor wall surrounded by a compressed air source and with the wall defining a primary combustion zone, the improvement comprising: a continuously operated pilot flame tube assembly supported on the combustor wall to maintain a continuous ignition flame within the primary combustion zone during engine deceleration, said assembly including a dome located exteriorly of the wall and having an interior bulkhead defining an upstream air space therebetween in communication with said air chamber, a pilot air swirler on said bulkhead including a pilot nozzle for continuously directing air and fuel downstream of said bulkhead for ignition as a continuously burning pilot flame located within said combustor wall for continuously igniting air fuel mixtures within said primary combustion zone, a double-walled open end flame tube surrounding said pilot ignition flame, said flame tube located with said combustor wall and having an outer tubular member of porous material with holes therein and an inner tubular member of porous material with holes therein, said inner tubular member being telescoped within and located in spaced relationship to said outer tubular member to form an air passage therebetween upstream of holes in both said tubular members, said porous material including at least two joined metal sheets, each of said joined metal sheets having performations therein to define a coolant passage between opposite sides of the joined metal sheets, said inner and outer tubular members having one end thereof sealed together at the open end of said flame tube to prevent air flow axially therefrom into said primary combustion zone, cooling air entrance means to direct compressed air from said air source to the surfaces of said inner and outer tubular members which define said air passage therebetween, said inner tubular member holes receiving air from said air passage for redistributing air as a sheath radially inwardly of said inner tubular member to continuously shield it from said pilot flame, said outer tubular member redistributing cooling air as a sheath radially outwardly through said outer tubular member to shield it against a flame within said combustor primary combustion zone thereby to maintain a continuous pilot flame within said primary combustion zone to prevent flameout therein during engine decelerations wherein air and fuel flows are reduced to the primary combustion zone.

3. A flame tube assembly for continuously igniting a combustor with a wall surrounded by a compressed air source, said assembly comprising an imperforate dome and an interior bulkhead defining an upstream pressurizable space therebetween, means for directing compressed air from the source into said space, a pilot air swirler on said bulkhead including a pilot nozzle for continuously directing air/fuel downstream of said bulkhead for forming a continuous pilot flame for ignition as a continuously burning pilot flame located within said combustor wall for continuously igniting air fuel mixtures within said primary combustion zone, an outer tubular member of porous material with holes and an inner tubular member of porous material with holes, said inner tubular member telescoped within and located in spaced relationship to said outer tubular member to form an air passage therebetween, said inner tubular member surrounding the continuous pilot flame, said inner and outer tubular members having one end thereof sealed together to prevent air flow axially therefrom, cooling air entrance means for directing compressed air from said air source to the surfaces of said inner and outer tubular members which define said air passage therebetween, said inner tubular member holes receiving air from said air passage for redistributing air as a sheath for distribution radially inwardly of said inner tubular member to continuously shield it from the pilot flame therein, said outer tubular member redistributing cooling air as a sheath radially outwardly through said outer tubular member holes to shield the outer tubular member from a flame within said combustor thereby to maintain a continuous pilot flame within the combustor to prevent flameout therein during periods of reduced air and fuel flow to the combustor.

4. A flame tube assembly for continuously igniting a combustor with a wall surrounded by a compressed air source comprising an imperforate dome and an interior bulkhead defining an upstream pressurizable air space therebetween, means for directing compressed air from the source into said space, a pilot air swirler on said bulkhead including a pilot nozzle for continuously directing air/fuel downstream of said bulkhead for forming a continuous pilot flame for ignition as a continuously burning pilot flame located within said combustor wall for continuously igniting air fuel mixtures within said primary combustion zone, an outer tubular member of porous material with holes and an inner tubular member of porous material with holes, said inner tubular member telescoped within and located in spaced relationship to said outer tubular member to form an air passage therebetween, said inner tubular member surrounding the continuous pilot flame, said porous material including at least two joined metal sheets, each having holes therein to define a coolant passage between opposite sides of the joined sheets, said inner and outer tubular members each having one end thereof sealed together to prevent air flow axially therefrom, cooling air entrance means for directing compressed air from said air source to the surfaces of said inner and outer tubular members which define said air passage therebetween, said inner tubular member holes receiving air from said air passage for redistributing air as a sheath for distribution radially inwardly of said inner tubular member to continuously shield it from the pilot flame therein, said outer tubular member redistributing cooling air as a sheath radially outwardly through said outer tubular member holes to shield the outer tubular member against a flame within said combustor thereby to maintain a continuous pilot flame within the combustor to prevent flameout therein during periods of reduced air and fuel flow to the combustor.

* * * * *